United States Patent [19]
Gonzales et al.

[11] Patent Number: 6,101,614
[45] Date of Patent: *Aug. 8, 2000

[54] METHOD AND APPARATUS FOR AUTOMATICALLY SCRUBBING ECC ERRORS IN MEMORY VIA HARDWARE

[75] Inventors: Mark A. Gonzales; Thomas J. Holman, both of Portland; Patrick F. Stolt, Beaverton, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/955,023

[22] Filed: Oct. 21, 1997

Related U.S. Application Data

[63] Continuation of application No. 08/693,459, Aug. 7, 1996, abandoned, which is a continuation of application No. 08/248,298, May 24, 1994, abandoned.

[51] Int. Cl.$^7$ ..................................................... G06F 11/08
[52] U.S. Cl. ................................ 714/6; 714/764; 710/39; 710/40
[58] Field of Search .......................... 395/185.05, 185.01, 395/183.01, 187.04, 187.06; 371/21.1, 21.6, 40.11, 40.2, 51.1; 710/39, 40; 714/5, 715

[56] References Cited

U.S. PATENT DOCUMENTS

| | | |
|---|---|---|
| 4,506,362 | 3/1985 | Morley . |
| 4,535,455 | 8/1985 | Peterson ..................................... 371/13 |

(List continued on next page.)

FOREIGN PATENT DOCUMENTS

| | | | |
|---|---|---|---|
| 0529945 | 8/1992 | European Pat. Off. . | |
| 1340283 | 12/1973 | United Kingdom . | |
| 1511806 | 5/1978 | United Kingdom . | |
| 2064840 | 6/1984 | United Kingdom . | |
| 2197098 | 5/1988 | United Kingdom . | |
| 529945A2 | 3/1993 | United Kingdom ........... | G11V 29/00 |
| WO81/01893 | 12/1980 | WIPO . | |

OTHER PUBLICATIONS

Slater, M., "Microprocessor–Based Design", Mayfield Publishing Company, 1987, p. 239.
van de Goor, A.J., "Computer Architecture and Design", Addison–Wesley Publishing Company, 1989, pp. 255–263.
Abstract of Japan, "Memory Control Unit", Nishimura Hiroyuki, Application date: Oct. 16, 1978, Application No. 55055499, Publication date: Apr. 23, 1980.
Supplementary European Search Report, EP95921376, date of search Aug. 25, 1997.

*Primary Examiner*—Robert W. Beausoliel, Jr.
*Assistant Examiner*—Scott T. Baderman
*Attorney, Agent, or Firm*—Blakely, Sokoloff, Taylor & Zafman LLP

[57] ABSTRACT

The present invention provides a method and apparatus for automatically scrubbing ECC errors in memory upon the detection of a correctable error in data read from memory. This is performed by providing in a memory controller memory control logic for controlling accesses to memory, an ECC error checking and correcting unit for checking data read from memory for errors and correcting any correctable errors found in the read data, a first data buffer for storing the corrected read data output from the ECC error checking and correcting unit and a writeback path having an input end coupled to an output of the first data buffer and an output end coupled to memory. Upon the detection of a correctable error in data read from a particular memory location, the ECC error checking and correcting unit signals to the memory control logic the existence of a correctable error in the read data. The memory control logic then obtains exclusive control over the first data buffer and the writeback path to control writing of the corrected read data onto the writeback path and subsequently to memory.

18 Claims, 3 Drawing Sheets

U.S. PATENT DOCUMENTS

| | | | |
|---|---|---|---|
| 4,604,750 | 8/1986 | Manton et al. | 371/38 |
| 4,888,773 | 12/1989 | Arlington et al. | 371/40.2 |
| 4,899,342 | 2/1990 | Potter et al. | 371/40.1 |
| 4,920,539 | 4/1990 | Albonesi | 371/40.2 |
| 4,964,129 | 10/1990 | Bowden, III et al. | 371/40.2 |
| 4,964,130 | 10/1990 | Bowden, III et al. | 371/40 |
| 5,127,014 | 6/1992 | Raynham | 371/37.3 |
| 5,233,616 | 8/1993 | Callander | 371/37.7 |
| 5,263,032 | 11/1993 | Porter et al. | 371/40.2 |
| 5,267,242 | 11/1993 | Lavallee et al. | 371/10.1 |
| 5,274,645 | 12/1993 | Idelman et al. | 371/10.1 |
| 5,274,646 | 12/1993 | Brey et al. | 371/40.1 |
| 5,325,375 | 6/1994 | Westberg | 371/51.1 |
| 5,367,526 | 11/1994 | Kong | 371/51.1 |
| 5,367,689 | 11/1994 | Mayer et al. | 398/725 |
| 5,388,108 | 2/1995 | Demoss et al. | 371/51.1 |
| 5,392,302 | 2/1995 | Kemp et al. | 371/51.1 |
| 5,410,545 | 4/1995 | Porter et al. | 371/21.6 |
| 5,428,630 | 6/1995 | Weng et al. | 371/40.1 |
| 5,430,742 | 7/1995 | Jeddeloh et al. | 371/40.1 |
| 5,459,839 | 10/1995 | Swarts et al. | 395/650 |
| 5,490,155 | 2/1996 | Abdoo et al. | 321/40.1 |
| 5,588,112 | 12/1996 | Dearth et al. | 395/182.07 |
| 5,644,583 | 7/1997 | Garcia et al. | 371/40.2 |

METHOD AND APPARATUS FOR AUTOMATICALLY SCRUBBING ECC ERRORS IN MEMORY VIA HARDWARE

This is a continuation of application Ser. No. 08/693,459, filed Aug. 7, 1996, now abandoned, which is a continuation of application Ser. No. 08/248,298, filed May 24, 1994 now abandoned.

FIELD OF THE INVENTION

This invention relates to data communications in a computer system, and more specifically, to the detection and correction of correctable errors in data transmitted between a microprocessor and a memory subsystem.

ART BACKGROUND

To maintain data integrity, most computer systems on the market today utilize error correction code (ECC) schemes implemented within ECC circuitry of a memory controller to detect, and in some cases, to correct errors detected in data read from memory. In computer systems that utilize ECC schemes, data to be written to memory is first encoded into a code word by appending the data with ECC parity bits derived by calculating the scalar product between the data and the generator matrix of an established ECC code. Upon reading the code word out of memory, it is decoded using a transform of the generator matrix to produce the original data in addition to a syndrome which can be used to detect and classify any occurring errors.

If no errors have been detected, the data read is placed on the system bus for subsequent use by the microprocessor or other bus agent. If an uncorrectable error is detected, the data is again placed on the system bus while the error condition is reported to the microprocessor. If, however, a correctable error is detected, the code word is first input into a correcting circuit to correct the data which is then output onto the system bus. (It is noted that if the computer bus is of a pipelined nature, the memory controller used to interface the system bus to memory would likely comprise separate read and write data buffers for temporarily storing the data as it passes between the system bus and memory.)

The above-described process effectively increases system reliability since all data entering the system is checked for ECC errors before it is utilized. However, due to the fact that most ECC schemes can only correct single and double bit errors within a byte, the occurrence of multiple errors in a single location in memory is likely to cause the data at that location to be uncorrectable, thereby significantly affecting any operations which need that data. Accordingly, system designers have developed software-based ECC scrubbing processes which correct error in data retrieved from memory write the corrected data back.

In a first conventional software-based scrubbing process, the detection of a correctable error in data being read from memory causes microcode to save the logical address of the erred memory location and generate a system call to an interrupt routine. The invoked interrupt routine then uses the logical address to calculate the physical address of the memory location and to re-read the data from the specified memory location. As the data is again read from memory, it is input to an ECC checking and correcting circuit to correct the data. After the data has been corrected, the interrupt service routine issues instructions to the microprocessor to cause the data to be written back to the same location in memory once the data has been placed on the system bus and the appropriate requests are made to the microprocessor.

Obviously, a major drawback with such a process is that it requires a substantial amount of time in addition to a significant amount of software support in order to perform even minor scrubbing operations. Because this process entails a completely separate process from that previously used to check and correct errors in the data when it is initially read from memory, it requires that a relatively complex interrupt routine be programmed in macrocode for re-calculating the physical address of the memory location and issuing the read and write commands which control the scrubbing operation. Hence, such a software-based process does not only require significant design modifications to the entire system, but it also reduces system performance due to the fact that the routine must take the time to recalculate the proper address, generate the proper commands and duplicate many of the steps which were already performed during the initial memory read.

Alternately, in another conventional, software-based scrubbing process, software is used to periodically (but continuously) scan through memory to check for and correct errors that it finds. This is accomplished by sequentially reading each memory location, checking the data for errors, correcting any correctable errors that are detected and writing the corrected data back to the same location. Data that is not in error is simply discarded after being checked. Yet, since this is similar to the above-described mechanism, this process also suffers from the amount of time and software support needed to perform the operation. Furthermore, this process also utilizes a significant amount of memory bandwidth, thereby preventing the most effective utilization of the memory bandwidth and impacting system performance.

SUMMARY OF THE INVENTION

Accordingly, it is an object of the present invention to provide a method and apparatus for automatically scrubbing ECC errors in memory upon the detection of correctable errors in data read from memory through the use a hardware-implemented mechanism that is transparent to software.

It is another object of the present invention to provide a method and apparatus for automatically scrubbing ECC errors in memory via a writeback path coupled between the outputs of the read and write data buffers upon the detection of correctable errors in data read from memory.

It is a further object of the present invention to provide a method and apparatus for automatically scrubbing ECC errors in memory which substantially increases system performance by avoiding the use of costly interrupt routines and requiring only a small fraction of the memory bandwidth to correct specifically identified errors the memory read data.

It is yet another object of the present invention to provide a method and apparatus for automatically scrubbing ECC errors in memory which increases system reliability by immediately correcting single bit errors in memory data before a second single bit error to the same location causes a loss of the memory data.

The present invention provides an efficient and transparent scrubbing mechanism within a memory controller for writing data that has been corrected by ECC hardware back into memory, thus scrubbing the memory location in error. The memory controller in which the scrubbing mechanism is implemented comprises at least memory control logic for controlling the flow of data to and from memory in addition to a single data buffer, although in the preferred embodiment, separate read and write data buffers are provided.

Data read from memory is checked for errors by the ECC hardware and stored in the read data buffer. If the memory controller detects a correctable ECC error in the read data, it corrects the data as it is being written into the read buffer. As is normally done, the read data is subsequently placed on a system bus for use by a microprocessor or other bus agents coupled thereto. However, to scrub the erred data in memory, a write back path is provided from the output of the read data buffer to the output of the write data buffer.

When ready, the memory control logic issues a memory scrub command to a datapath state machine, which controls the flow of data to and from memory, to signal that the corrected data within the read buffer is to be written back to the memory location from which it came. Upon decoding the command, the state machine first issues a read source select signal to a read data buffer control multiplexor to select the control source which will issue commands to access the particular buffer and initiate a read operation therefrom. The state machine also issues a buffer select signal to an output multiplexor which has as inputs both the write data and the read data from the respective buffers and has its output coupled to memory via memory input/output buffers and memory interface components.

Once this has been done, the selected control source then asserts a read strobe to the read data buffer to read the data out of the buffer. The data passes through the output multiplexor and into an ECC code word generation unit where a corresponding code word is produced and stored within the memory input/output buffers. The control logic then issues the appropriate address and request attribute signals to the memory interface components, which in turn generate the appropriate RAS# and CAS# signals so that the corrected data is written to the location in memory specified by the original read request.

According to a first alternate embodiment, this mechanism can also be used to perform periodic software-based scrubbing of the memory array. Since any location in error is automatically scrubbed upon correction of erred read data, the entire memory can be scrubbed by sequentially reading each location in memory.

According to a second alternate embodiment, the same mechanism can be used to generate a new ECC code word when a read-modify-write operation is performed. This is accomplished by first storing the partial write data in the write buffer and then reading the data to be modified from memory and storing it in the read data buffer. With the appropriate control signals being issued from the control logic, both the read and write data is merged in the output multiplexor as it is being written to memory.

DETAILED DESCRIPTION OF THE INVENTION

The present invention provides a method and apparatus for automatically scrubbing ECC errors in memory upon detecting correctable errors in data read from memory through the use of a writeback path coupled between the outputs of the read and write data buffers of a memory controller. For purposes of explanation, specific embodiments are set forth in detail to provide a thorough understanding of the present invention. However, it will be apparent to one skilled in the art that the present invention may be practiced with other embodiments and without all the specific details set forth. In other instances, well known architectural elements, devices, circuits, process steps and the like are not set forth in detail in order to avoid unnecessarily obscuring the present invention.

I. Overview of the Memory Controller

Figure 1:
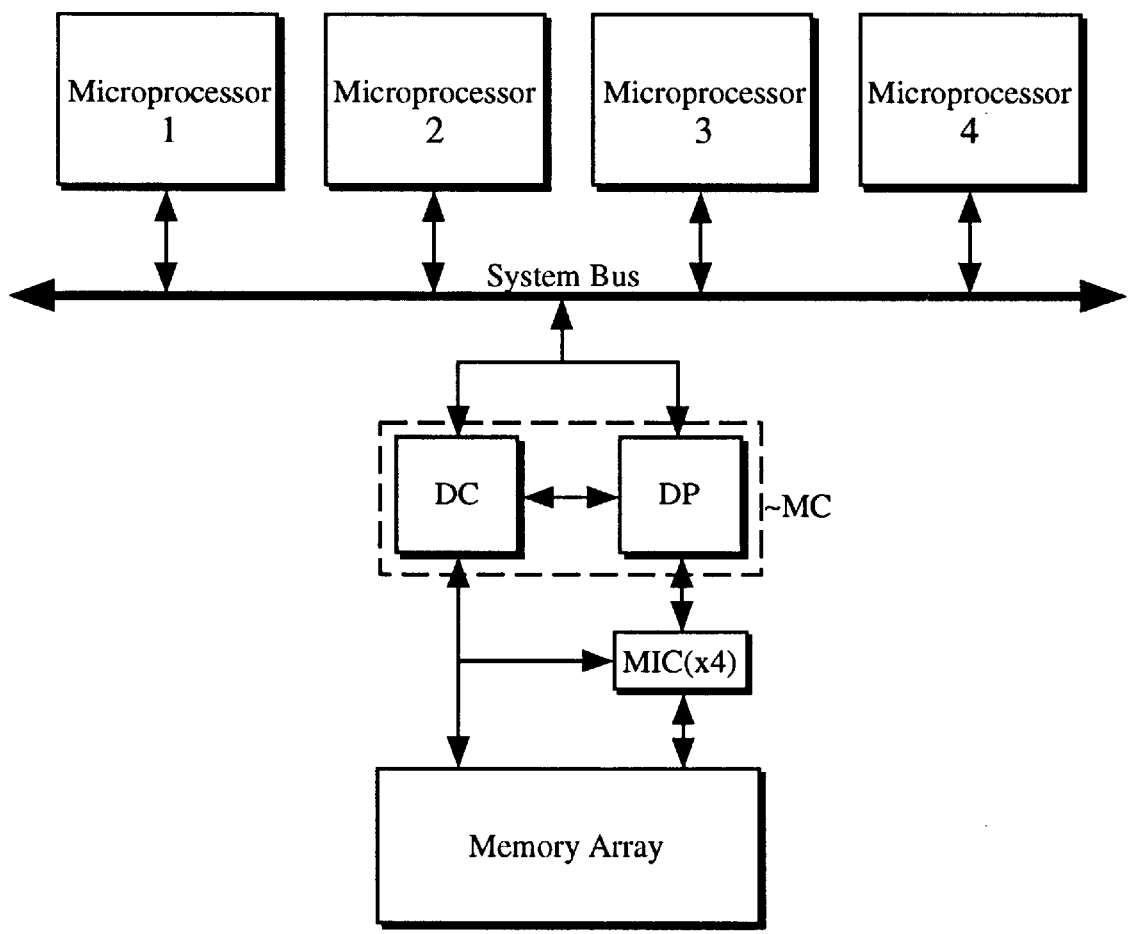
FIG. 1 is a block diagram of a generalized computer system comprising a plurality of microprocessors and a memory subsystem in which a memory controller is coupled to a memory array via memory interface components.

In accordance with one embodiment of the present invention, the scrubbing mechanism is implemented in a pipelined, multiprocessor computer system, generally shown in FIG. 1, which comprises up to 4 microprocessors, a system bus and a memory subsystem which preferably includes a DRAM memory array, a memory controller (MC) for handling memory access requests and memory interface components (MICs) for interfacing the MC to the memory array by multiplexing read data from and buffering write data to the interleaved memory.

The system bus provides 36 bits of address, 64 bits of data and the control signals needed to support data integrity, to perform bus transactions and to maintain coherent shared memory in the presence of multiple caches. The system bus can support eight physical loads at 66.7 MHz (and more at lower frequencies) so that an additional I/O bus bridge, MC, or other custom attachment may be connected to the bus.

With regard to the memory array, three different types of memory configurations are supported: A 4:1 interleaved DRAM configuration with up to 4 GBytes of memory using 64 Mbit technology, a 2:1 interleaved DRAM configuration with up to 2 GBytes of memory and a non-interleaved DRAM configuration with up to 1 GByte of memory. In this particular embodiment, up to four MCs can be coupled to the system bus so that a fully configured system would have a maximum of 16 GBytes of addressable memory.

The memory supported by the MC is preferably arranged as 8 rows with 1, 2 or 4 interleaves. Although any type of RAM devices may be implemented for the memory, those preferably used comprise either discrete memory devices, single-sided SIMMs, or double-sided SIMMs. For all three memory configuration types, the MC provides 8 logical RAS# signals, one per row, while two copies of the RAS# signals are provided for fanout. For implementations that use discrete memory devices or single-sided SIMMs, the MC provides 8 logical CAS# signals, one per row, while two copies are again provided for fanout. In the case of double-sided SIMMs, however, there are only 4 logical CAS# signals (one per pair of rows), and the loading per CAS# signal is doubled.

Figure 2:
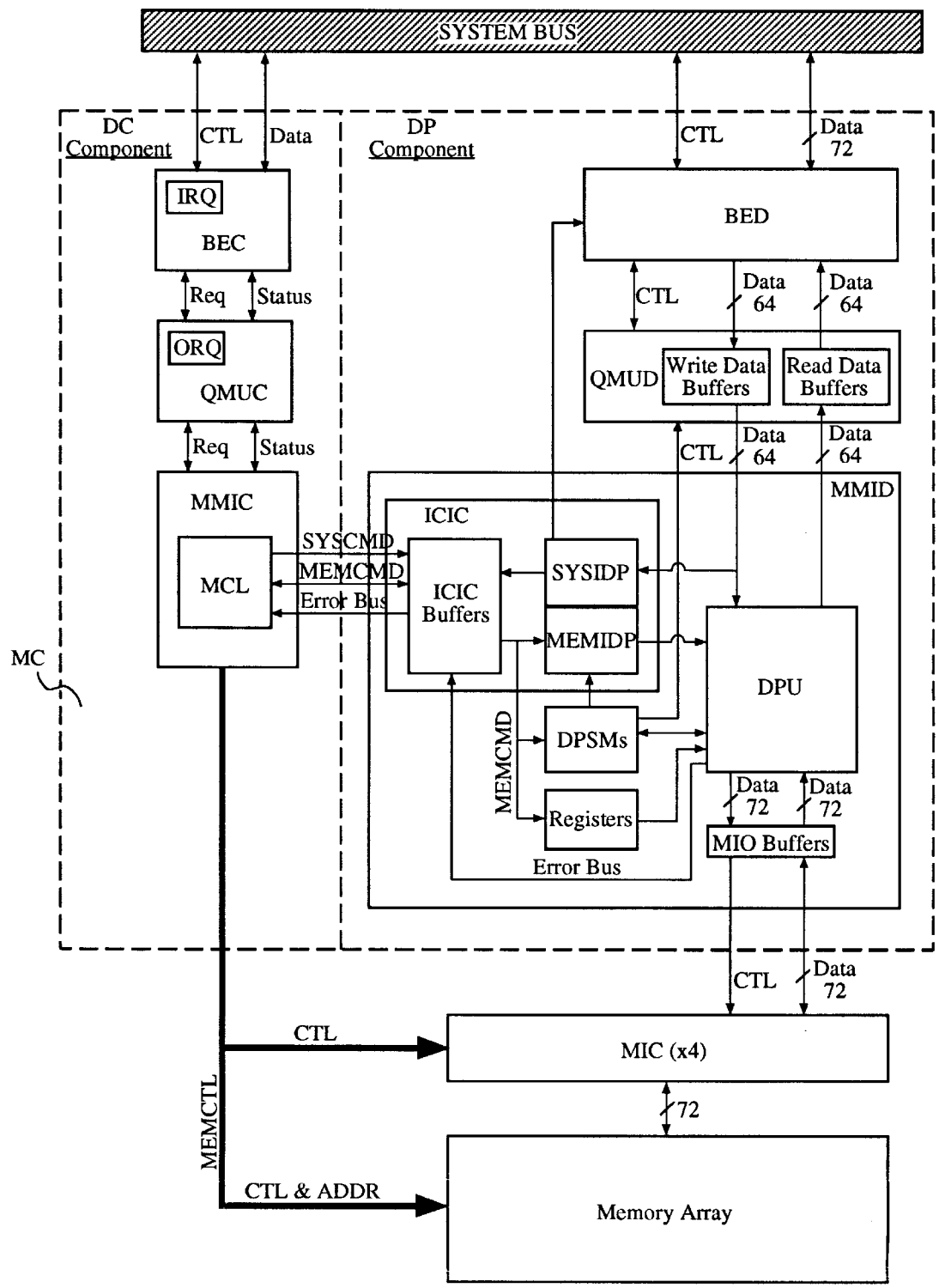
FIG. 2 is a block diagram of the memory controller shown in FIG. 1 in accordance with the present invention.

As shown in FIGS. 1 and 2, the MC is divided into two ASICs, one forming a DRAM Controller (DC) component and the other forming a Data Path (DP) component, thereby separating the address and data flows through the MC so as to improve the speed and efficiency of the pipelined system. The DC component is responsible for handling all memory access requests and commands in addition to address decoding for the memory accesses, while the DP component is responsible for the flow of data to and from memory.

The components are functionally coupled together via an interchip interconnect (ICIC) which comprises the communications paths and buffers needed to transmit data and control information between the two components. Both ASICs are designed to connect directly to the system bus without external glue components, and together constitute only one bus load. It is noted that although in this particular embodiment the MC is preferably divided into separate ASIC components for purposes of improving efficiency, speed and cost effectiveness, it can be implemented as a single package, memory controller, and can further be utilized in both multiprocessor and single processor as well as pipelined and non-pipelined systems.

Referring to FIG. 2, the DC component of the MC is functionally divided into three main sections: a Bus Engine (BEC), a Queue Management Unit (QMUC) and a Memory Interface (MMIC). The BEC provides the interface to the system bus, while the QMUC couples the BEC to the MMIC. The BEC contains an in-order-queue for system bus requests in addition to the state machines (not shown) needed to control the bus and to orchestrate data transfers between the bus and the MC data buffers (not shown). The BEC is also responsible for buffer allocation in the DP component and for control of the system-side interface (SYSIDP) of the ICIC located within the DP component. The QMUC is the primary interface between the BEC and the MMIC and comprises an outbound request queue (ORQ) for buffering system bus requests and corresponding addresses received from the BEC for use by the MMIC in decoding requests and performing memory accesses.

The MMIC provides all of the memory controller specific functionality of the MC. The primary functions of the MMIC is to control the MMIC side of the QMUC, to control the external memory and to control the interchip interface to the DP component. This unit also converts system requests into both DRAM memory cycles and interchip cycles. With regard to the interface between the MMIC and the ORQ of the QMUC, the MMIC uses the ORQ 1) to provide the effective address of the current request to the ORQ, 2) to read the next request from the ORQ and 3) to read the status of the next request. In this respect, the MMIC also provides response information back to the BEC via the QMUC.

The main units of the MMIC preferably consist of 1) an address decode unit (not shown) for determining if the registered bus request is destined for the MC and for computing an effective address for accesses to the DRAM array, 2) a request address unit (not shown) for determining where in the memory array the request is destined and for maintaining a table of open pages in the memory array, 3) memory control logic (MCL) for controlling the other units based on the current request from the QMUC and for generating the memory subsystem control signals, the memory-side interchip interconnect signals, the MIC interface signals, and the memory reset and error signals, 4) a configuration register unit (not shown) which contains all the configuration registers, logic and state machines required to precalculate internal parameters and control the reading and writing of configuration space via the ICIC, and 5) a memory refresh unit (not shown) for controlling the memory refresh rate.

On the datapath side, the DP component of the MC supports the data flow from the system bus to the memory array and is disassociated from the memory control interfaces since all controls for the bus and the memory interface are generated by the DC component. The main functions of the DP component are to provide a 64 bit datapath from the bus to memory, to provide ECC support for data both on the bus and in memory, to scrub (or correct) any correctable errors in the memory array and to provide support for single clock cycle data transfer bursts.

Similar to the DC component, the DP is functionally divided into three main sections: a Bus Engine (BED), a Queue Management Unit (QMUD) and a Memory Interface (MMID). The BED provides the interface to the system data bus, while the QMUD couples the BED and the MMID through a plurality of data buffers. As shown in FIG. 2, the QMUD comprises a set of read data buffers for temporarily buffering data read from memory before it is placed on the system bus and a set of write data buffers for temporarily buffering write data received from the system bus before it is written to memory. The status of each request is kept track of by the MCL of the DC component from which the transaction commands are generated. To maximize system performance in a pipelined system, each set of data buffers preferably comprises four buffers such that a total of eight different memory accesses may be in process at any one time. Nonetheless, any number of read and write data buffers may be used in either a pipelined or non-pipelined system without departing from the spirit of the present invention.

Also shown in FIG. 2, the MMID comprises a plurality of data and control interfaces to the QMUD, the BED, the ICIC and the external memory array. The main functional units of the MMID include 1) the memory input/output (MIO) buffers, which buffer the signals used to access the memory array, 2) the DP operation registers, which can be programmed via the DC component for operational control of the DP component, 3) the data path unit (DPU), which transfers and converts the data from the QMUD buffers to the selected memory locations and vice versa, 4) the ICIC, which includes the ICIC buffers, the system-side interface to the DP component (SYSIDP) and the memory-side interface to the DP component (MEMIDP) for buffering data and commands received from the MCL of the DC component and converting the commands into data transfer control signals, and 5) the datapath state machines (DPSMs), which provide the control for all other blocks based on the current command from the MCL via the ICIC.

The ICIC is provided with a system-side interface (SYSIDP) for handling all commands related to the BED and QMUD data traffic, and a memory-side interface (MEMIDP) which handles all commands related to the QMUD, the memory data traffic and the configuration programming of the DP component. Bus requests that target the MC will result in at least one command being generated by the MCL and transmitted to the SYSIDP where the commands are processed and converted into control signals which then direct the flow of data from the BED to the QMUD or vice versa. The commands processed by the SYSIDP will also be sent to the MEMIDP to initiate data transfers to or from memory.

The DPSMs process memory commands received from the DC component and control the flow of data between the QMUD and the memory array. They also report errors, by type, to the DC component through the ICIC at the end of each memory command. The DP registers comprise among other things a configurable ECC register which is used to enable ECC checking for both system data and memory data.

Figure 3:
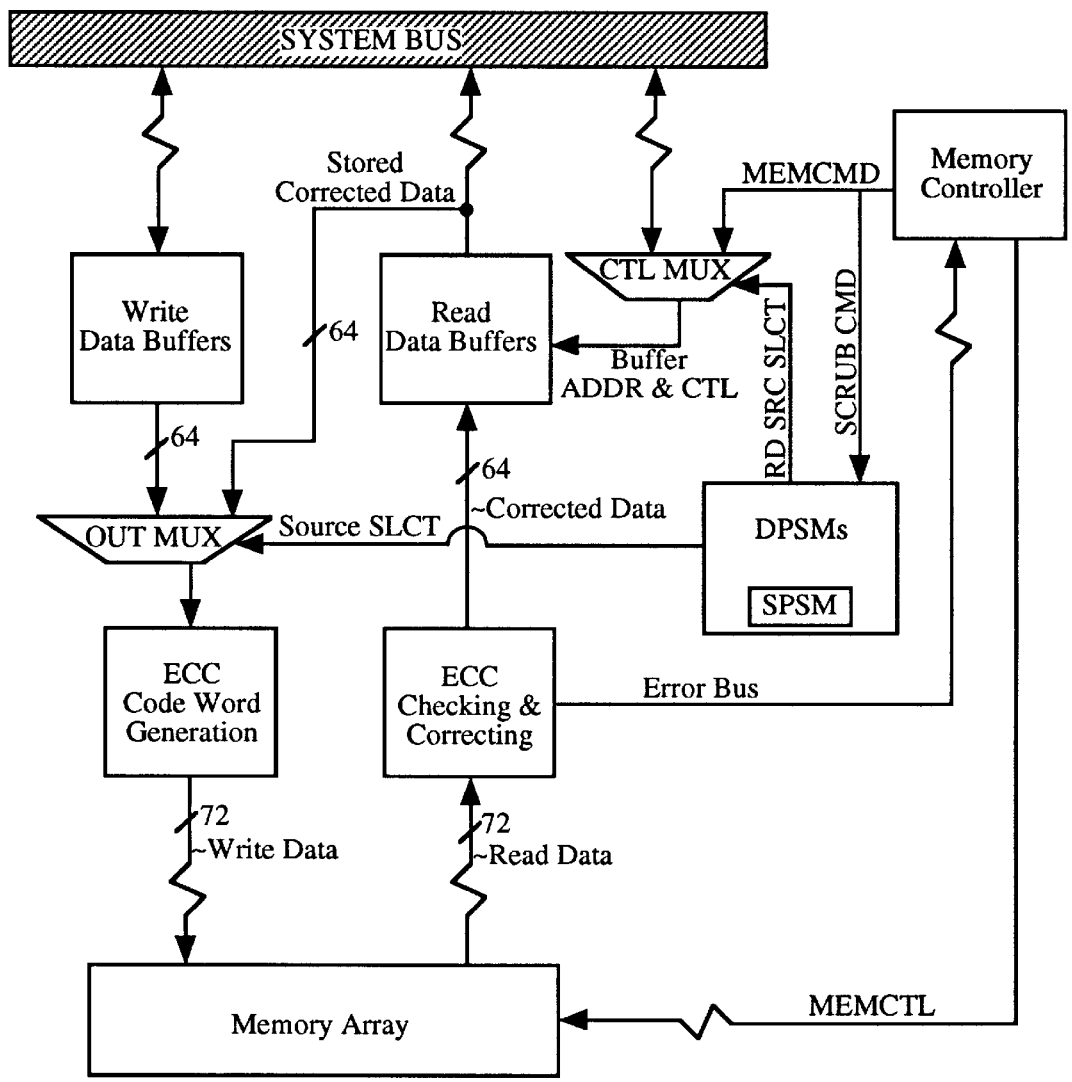
FIG. 3 is a block diagram of the specific components of the memory controller and their interconnections which form the automatic scrubbing mechanism of the present invention.

With regard to the DPU, shown in FIGS. 2 and 3, a read data bus and a write data bus are provided within the DPU for transferring data from memory to the read data buffers of the QMUD and from the write data buffers of the QMUD to memory, respectively. As shown in FIG. 3, the DPU further comprises an ECC checking and correcting unit and an ECC code word generation unit. Outbound, write data (i.e. a 64 bit DWORD in the preferred embodiment) is first popped off a write data buffer and then input to the ECC code word generation unit where 8 parity bits are calculated and appended to the DWORD to form a 72 bit code word that is subsequently written to memory via the MIO buffers.

Conversely, inbound, read data in the form of a 72 bit code word is first buffered in the MIO buffers and then directed into the ECC checking and correcting unit to decode the code word, check the data for errors and correct any correctable errors before it is stored within a read data buffer of the QMUD. In this case, the 72 bit code word is decoded into the original 64 bit DWORD and is further used to calculate a syndrome for the code word. The syndrome is input into an error classification circuit (not shown) to determine whether an error has occurred. If an error did occur, this error condition is reported to the MCL of the DC component via the Error bus as either a correctable error or an uncorrectable error. If correctable, the syndrome for the code word is input into an error correction circuit (not shown) so as to produce as output to the read data buffers of the QMUD a corrected DWORD.

Although any ECC code can conceptually be utilized with the present invention, the ECC code preferably used in this embodiment of the invention comprises a (72, 64) SEC-DED-S4ED rotational error control code, this code being described in detail in co-pending U.S. patent application Ser. No. 08/176,351 filed on Dec. 30, 1993 and assigned to Intel Corporation of Santa Clara. The H matrix for the code is designed to support parity checking over a 72 bit datapath. All columns of the H matrix are linearly independent and have an odd weight, with each 4-bit wide column being arranged to allow detection of 4-bit byte errors. One and two bit errors are covered by the SEC-DED property, whereas triple errors generate an odd syndrome of weight 5 that is not equal to any of the weight 5 columns in H. Additionally quadruple errors give a non-zero, even weight syndrome. Accordingly, this particular ECC code can (1) detect and correct single bit errors since each column is unique, (2) detect double bit errors since each column has an odd weight, (3) detect three bit errors within a nibble since such errors will result in a syndrome that has one half with weight 2 and one half with weight 3, and (4) detect four bit errors within a nibble since such errors will result in a syndrome that cannot sum to zero.

II. Automatic ECC Scrubbing Mechanism

In accordance with the embodiment of the MC described above, automatic memory scrubbing upon memory reads is accomplished by means of a corrected data writeback path coupled between the outputs of the QMUD read and write buffers and under the control of the MCL via the DPSMs. With reference to FIG. 3, once the ECC checking and correcting unit has detected a correctable error in a code word read from memory, that unit signals this condition to the MCL via the Error Bus, corrects the erred data and then sends it to the next allocated read buffer in the QMUD. Under the control of the MMIC, the BED eventually places the data from the read buffer onto the system bus for use by the microprocessors or other bus agents. However, a copy of the data is still maintained in the allocated read buffer until the corresponding request in the request queue of the DC component is retired.

The MCL keeps track of the buffer allocation, and specifically the buffer in which the now corrected data is stored, and tags the corresponding bus request in the request queue with an error tag. Subsequently, the MCL issues a memory scrub command to the DPSMs on the MEMCMD bus (via the ICIC) to signal that the corrected data within the read buffer is to be written back to the memory location from which it came. Due to the pipelined nature of the MC, the scrub command need not be immediately issued since the MCL may choose to perform or complete higher priority transactions using the other data buffers of the QMUD. However, if only one read data buffer is provided, then memory scrubbing would have to be performed before the corrected read data is discarded from the buffer, or overwritten by subsequent reads.

Once received by the DPSMs, the scrub command, which identifies the particular buffer in which the corrected data is stored in addition to the length of the data, is decoded and a scrub processing state machine (SPSM) is selected so as to initiate scrub processing. In scrub processing, the SPSM first issues a read source select signal to a read data buffer control multiplexor (CTL MUX) to select the control source which will issue commands to access the particular buffer and initiate a read operation therefrom. Upon assertion of the read source select signal, the output of the CTL MUX is changed from a first "bus agent" control input (via the system bus) to a second MCL control input from (via the MEMCMD bus) so that the MCL now controls the addressing and strobing of the read data buffers.

The SPSM machine also issues a buffer select signal to an output multiplexor (OUT MUX) which has as input both the write data and the read data from their respective buffers and has its output coupled to memory via the MIO buffers and the MICs. Once this has been done, the SPSM then asserts a read enable signal to the CTL MUX to read the data out of the read data buffer. The data passes through the OUT MUX and into the ECC code word generation unit where a code word is produced and stored within the MIO buffers of the MMID. The MCL then issues the appropriate address and request attribute signals to both the MICs and the memory array via a memory control bus so that the corrected data is then written to the location in memory specified by the original read request still present in the request queue of the DC component. Once the corrected data has been written back to the same memory location, the tagged request in the request queue of the DC component is retired and the corresponding read data buffer is deallocated for future use.

In another embodiment of the present invention, the above-described scrubbing mechanism is used to perform periodic scrubbing of the memory array via the hardwired writeback path. Since any memory location in error is automatically scrubbed upon the correction of erred read data, the entire memory can simply be scrubbed by sequentially reading each location in memory. Furthermore, because the MCL of the MC generates the control signals appropriate for controlling the writeback of corrected data upon detection of correctable errors, the only software support required from the microprocessor is that needed to set-up the configuration registers for this particular operation.

According to a second alternate embodiment, the same mechanism can be used to generate a new ECC code word when a read-modify-write operation is performed. This is accomplished by first storing the partial write data in the write buffer and then reading the data to be modified from memory and storing it in the read data buffer. By applying the appropriate buffer select and byte enable signals to the output multiplexor, the datapath state machine will then merge both the read and write data via the output multiplexor as it is written to memory. This not only provides a simple and efficient means for generating ECC for a read-modify-write operation, but also ensures that an uncorrectable double bit error will not be produced in the process, thereby increasing system reliability.

Accordingly, through the use of a hardware scrubbing mechanism comprising a corrected data writeback path to memory, the present invention is able to overcome the disadvantages inherent in conventional software-based scrubbing mechanisms. By utilizing the already existing ECC checking and correcting circuitry and taking advantage of its operation, the invention is able to simplify previous ECC scrubbing processes so as to improve over-all system performance and reliability while simultaneously reducing the amount of memory bandwidth required for memory scrubbing operations.

It will be appreciated that various modifications and alterations might be made by those skilled in the art without departing from the spirit and scope of the present invention. Thus, it is understood that the invention is not to be limited by the foregoing illustrative details, but rather is to be defined by the appended claims.

We claim:

1. In a memory controller, a method comprising:
   reading data from an address in memory indicated by a memory read request that is queued in a request queue of a memory controller;
   detecting that the data has a correctable error;
   tagging the memory read request in the request queue to indicate that the data has a correctable error;
   correcting the correctable error in the data to generate corrected data; and
   writing the corrected data back to the address in memory indicated by the tagged memory read request before retiring the tagged memory read request from the request queue.

2. The method of claim 1 further comprising outputting the corrected data onto a system bus to fulfill the memory read request.

3. The method of claim 1 further comprising control logic within the memory controller issuing a scrub command and wherein writing the corrected data back to the address in memory indicated by the tagged memory read request occurs in response to the control logic issuing the scrub command.

4. The method of claim 1 further comprising storing the corrected data in a read buffer in the memory controller and wherein writing the corrected data back to the address in memory comprises establishing a writeback path from the read buffer to the memory.

5. The method of claim 4 further comprising control logic within the memory controller issuing a scrub command in response to said detecting that the data has a correctable error and wherein the write back path from the read buffer to the memory is established in response to the scrub command.

6. The method of claim 5 wherein storing the corrected data in a read buffer in the memory controller comprises storing the corrected data in one of a plurality of entries in the read buffer, and wherein the scrub command indicates which of the plurality of entries in the read buffer contains the corrected data.

7. The method of claim 1 wherein writing the corrected data back to the address in memory indicated by the tagged memory request is performed subsequent to at least one other memory access that has a higher priority.

8. A memory controller comprising:
   a request queue to store memory access requests;
   a memory interface to read data from an address in memory indicated by a memory read request that is queued in the request queue;
   error checking and correcting logic coupled to receive the data read from the address in memory, the error checking and correcting logic being configured to detect whether the data has a correctable error and to issue an error signal and correct the correctable error to generate corrected data if the data has a correctable error; and
   control logic coupled to receive the error signal from the error checking and correcting logic, the control logic being configured to
      tag the memory read request in the request queue in response to the error signal to indicate that the data has the correctable error, and
      write the corrected data back to the address in memory indicated by the tagged memory read request before retiring the tagged memory read request from the request queue.

9. The memory controller of claim 8 further comprising a bus engine coupled to receive the corrected data and to output the corrected data onto a system bus to fulfill the memory read request.

10. The memory controller of claim 8 wherein the control logic is further configured to issue a scrub command to establish a write back path to write the corrected data back to the address in memory indicated by the tagged memory read request.

11. The memory controller of claim 10 further comprising a read buffer coupled to receive the corrected data from the error checking and correcting logic, and wherein the write back path is established between the read buffer and the memory.

12. The memory controller of claim 11 wherein the read buffer includes a plurality of entries and wherein the scrub command issued by the control logic indicates which of the plurality of entries in the read buffer contains the corrected data.

13. The memory controller of claim 8 wherein the control logic is further configured to write the corrected data back to the address in memory indicated by the tagged memory request subsequent to performing at least one other memory access that has a higher priority.

14. A system comprising:
   a system bus
   one or more processors each coupled to the system bus;
   a memory; and
   a memory controller coupled between the system bus and the memory, the memory controller including
      a request queue to store memory access requests received via the system bus;
      a memory interface to read data from an address in the memory indicated by a memory read request that is queued in the request queue;
      error checking and correcting logic coupled to receive the data read from the address in the memory, the error checking and correcting logic being configured to detect whether the data has a correctable error and to issue an error signal and correct the correctable error to generate corrected data if the data has a correctable error; and
      control logic coupled to receive the error signal from the error checking and correcting logic, the control logic being configured to
         tag the memory read request in the request queue in response to the error signal to indicate that the data has the correctable error, and
         write the corrected data back to the address in the memory indicated by the tagged memory read request before retiring the tagged memory read request from the request queue.

15. In a memory controller, a method comprising:
   detecting that data read from memory in response to a memory read request has a correctable error;

correcting the correctable error to generate corrected data;

storing the corrected data in one of a plurality of entries in a read buffer;

issuing a scrub command in response to detecting that the data read from memory has a correctable error, the scrub command establishing a writeback path to write the corrected data back to memory, and wherein the scrub command indicates which of the plurality of entries in the read buffer contains the corrected data; and writing the corrected data back to memory via the writeback path subsequent to at least one other memory access that has a higher priority.

16. The method of claim 15 further comprising outputting the corrected data onto a system bus to fulfill the memory read request.

17. The method of claim 15 wherein writing the corrected data back to memory via the writeback path is performed subsequent to at least one other memory access that has a higher priority.

18. The method of claim 15 wherein establishing a writeback path to write the corrected data back to memory comprises issuing a source select signal to select the corrected data as a write data source instead of a write data buffer.

* * * * *